United States Patent

[11] 3,611,209

[72] Inventor Burton R. Saltzberg
Middletown, N.J.

[21] Appl. No. 884,128
[22] Filed Dec. 11, 1969
[45] Patented Oct. 5, 1971
[73] Assignee Bell Telephone Laboratories, Incorporated
Murray Hill, Berkeley Heights,, N.J.

[54] DIGITAL FILTER FREQUENCY SHIFT MODULATOR
11 Claims, 3 Drawing Figs.

[52] U.S. Cl. .......... 332/9, 178/66, 325/163, 332/14, 332/18
[51] Int. Cl. .......... H04l 27/12
[50] Field of Search .......... 332/9, 9 T, 16, 16 T, 18, 19, 14; 331/179; 325/30, 163; 178/66

[56] References Cited

UNITED STATES PATENTS

| | | | |
|---|---|---|---|
| 2,817,017 | 12/1957 | Hall .......... | 331/179 X |
| 3,199,028 | 8/1965 | McLin et al. .......... | 332/19 X |
| 3,454,718 | 7/1969 | Perreault .......... | 325/163 X |
| 3,508,136 | 4/1970 | Danielsen et al. .......... | 325/30 X |

OTHER REFERENCES

Nowak et al. " A Nonrecursive Digital Filter and Data Transmission" IEEE Trans. of Audio & Electroacoustics" Vol. AU- 16, Sept. 1968 pp. 343- 349

*Primary Examiner*—Alfred L. Brody
*Attorneys*—R. J. Guenther and Kenneth B. Hamlin

ABSTRACT: Feedback circuitry is designed to place a digital filter on the borderline of stability. The filter, therefore, oscillates in a numerical sense. Other feedback circuitry includes two independent multipliers, each capable of determining different central coefficients, and thus different oscillation frequencies. Switch means operated by DC baseband data signals alternatively insert one or the other of the multipliers in the feedback path whereby the output frequency of the filter is shifted in accordance with the input data. Amplitude variations due principally to quantizing noise are stabilized by a correction generator which checks the amplitude of the filter output number and modifies the multiplied feedback number when the output number varies from a predetermined limit. The modulator is advantageously arranged to be time shared by a plurality of channels.

INVENTOR
B. R. SALTZBERG
BY R.C. Lipton
ATTORNEY

DIGITAL FILTER FREQUENCY SHIFT MODULATOR

FIELD OF THE INVENTION

This invention relates to frequency-shift signal transmitters and, more particularly, to signal transmitters, such as frequency-shift signal modulators, which utilize digital filtering techniques and are therefore capable of being shared, on a time-division basis, by a plurality of signaling sources.

DESCRIPTION OF THE PRIOR ART

In the data processing and data switching arts the central processor or switcher terminates large numbers of outgoing data signaling channels. The data channel, in many instances, will comprise a telephone line which conventionally is suitable to convey voice frequency signals. Accordingly, voice frequency-shift signals representing the DC data base band signals from the processor or switcher signaling source are generated and applied to the appropriate signaling channels. Switching the frequency of the voice frequency signal carrier under control of the DC data signals is provided by a data set transmitter modulator, which generally utilizes (inductive and/or capacitive) oscillatory circuits to produce the voice frequency signals.

Since a plurality of outgoing channels are terminated, the data set transmitters (together with receivers and control equipment) are sometimes grouped to form an arrangement called a multiple data set. To reduce the size, cost and complexity of the multiple data set, it is advantageous to employ equipment which can be used in common by the data set transmitters. One such common equipment used in the past is a common power supply supplying the power requirements of all the data sets.

It is an object of this invention to further reduce the size, cost and complexity of the data set.

The most significant circuit in the transmitter is the oscillatory circuit. It is known that unstable filter circuits tend to oscillate and therefore comprise one form of oscillatory circuit. It is further known that, with respect to filtering signals, digital filtering can be employed, on a time-shared basis, to accommodate a plurality of signal sources.

Digital filtering is the computational process wherein sequential numbers which define samples of an analog signal are digitally processed to simulate continuous filter functions. The digital filter is, therefore, the digital circuitry which performs the computational process. The filtering process involves the weighting of previous and the present samples of the signal. One way this can be implemented is to feed back the filter output numbers through multipliers which determine the coefficients of the filter. The output of the digital filter then comprises numbers, in sequence, which represent signal samples of an analog signal corresponding to the output of an analog filter. It is obvious that a plurality of signals can be processed in this manner by multiplexing, on a time-division basis, the numbers representing the samples of the various signals. The digital filter is therefore capable of being shared on a time-shared basis by a plurality of channels.

Accordingly, it is a further object of this invention to produce the voice frequency signals using digital filtering techniques. Specifically, it is an object of this invention to generate frequency-shift signals representing DC data baseband signals utilizing a digital filter in place of the conventional analog oscillatory circuit, an advantage of using the digital filter being that it is capable of being shared on a time-shared basis by a plurality of signaling channels.

SUMMARY OF THE INVENTION

The specific embodiment of this invention described herein comprises a data set transmitter which utilizes digital circuitry, including a digital filter, to generate frequency-shift signals (in a numerical sense) representing data signals. Since digital circuitry is employed, the transmitter is capable of being shared on a time-shared basis by a plurality of data sources.

In accordance with a feature of this invention, the filter feedback circuitry is arranged to place the digital filter on the borderline of stability. The filter therefore "oscillates" (in a numerical sense). In addition, two independent feedback multipliers are provided, each capable of determining different central coefficients (and thus different oscillatory frequencies). Switch means operated by the data signals from the signal sources alternatively inserts one or the other multipliers in the feedback path of the filter whereby the output frequency of the filter is shifted in accordance with the input data signals.

It has been found that oscillatory digital filters are subject to severe amplitude variations due principally to quantizing noise. It is a further feature of this invention that the amplitude of the output signal of the filter is stabilized. Specifically, the amplitude of the filter output number is checked and, in response thereto, the number fed back is modified; i.e., a correction is made to the multiplied feedback number. Specifically, the value of the feedback number is decreased if the output number amplitude exceeds a predetermined limit and is increased if the amplitude fails to reach the limit for a full oscillatory signal cycle.

The foregoing and other objects and features of this invention will be more fully understood from the following description of an illustrative embodiment thereof taken in conjunction with the accompanying drawings.

DETAILED DESCRIPTION

Figure 3:
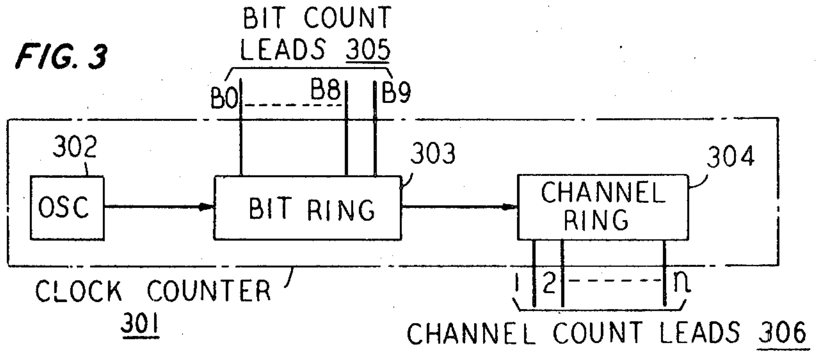
FIG. 3 shows, in schematic form, a suitable arrangement for a common clock circuit.

The digital modulator is advantageously embodied in a system which may be described as a multiple data set transmitter which interconnects a plurality of sources of baseband binary data signals and a corresponding plurality of outgoing telephone lines. Specifically, the DC baseband data signals from each of the data sources are frequency modulated on a voice frequency carrier and the frequency shift signals provided therefrom are applied to an associated telephone line. In general, these functions are provided by a scanner, identified in FIG. 1 by block 102, digital FSK modulator 103, distributor 104, and clock counter 301, FIG. 3, which maintains the system synchronized.

Figure 1:
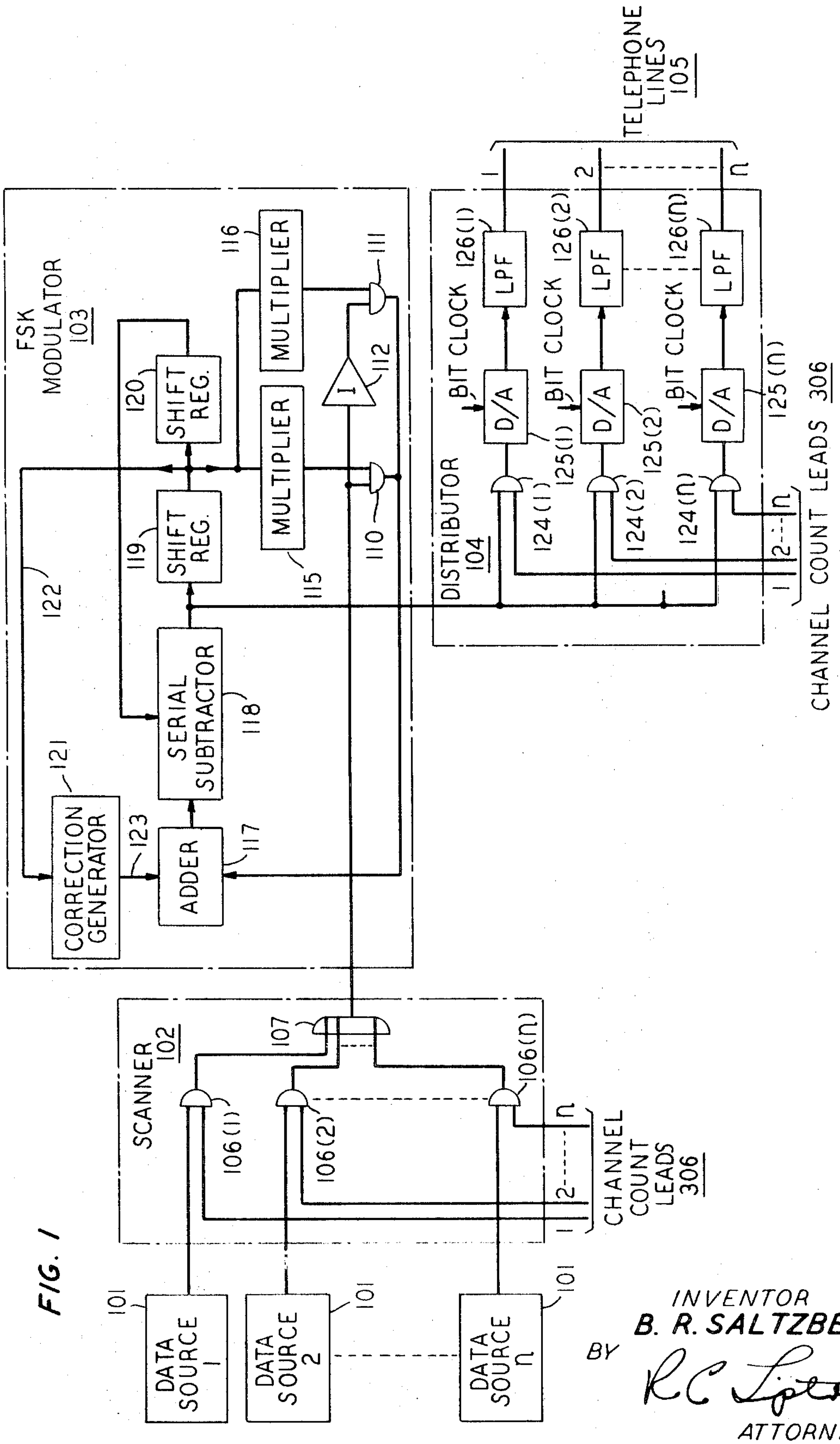
FIG. 1 discloses, in block form, the various equipment and manner in which they cooperate to form a multiple data set transmitter in accordance with this invention.

Scanner 102 is connected to a plurality of data sources, identified as a group as data sources 101. In FIG. 1 there are shown *n* data sources, represented by blocks and identified by numbers 1 to *n* and each block so identified represents a source of DC baseband binary data signals. The output of scanner 102 is connected to FSK modulator 103 whose output, in turn, extends to distributor 104.

Distributor 104 includes a plurality of outputs which extend to telephone lines identified as telephone lines 105. There are shown *n* telephone lines, each symbolically representing the tip and ring of a telephone line and identified by a number from 1 to *n*, which number also shows the association with the correspondingly numbered one of data sources 101.

Considering first scanner 102, this circuit generally provides the function of scanning the DC baseband signals provided by data sources 101 under the control of scanning or gating signals provided by clock counter 301 by way of channel-count leads 306. Scanner 102 thereby produces, at the output thereof, successive trains of bits, each train comprising a sequence of bits corresponding to the sequential scanning of the data signals provided by sources 1 through *n* of data sources 101. The output of scanner 102 is then passed to FSK modulator 103.

The function of FSK modulator 103 is to utilize each bit (which is derived from an individual data source) to process a number (dedicated to the data source) by use of digital filter techniques and thereby derive output numbers which define the polarity and amplitude of a frequency-shift signal. Each incoming bit from scanner 102 functions to modify the processing of the number in FSK modulator 103 by shifting (in a numerical sense) the frequency of the output signal to above the carrier midband frequency when the incoming bit indicates a mark signal and to below the midband carrier frequency when the incoming bit designates a space signal.

Distributor 104 accepts the output numbers from FSK modulator 103 and, under control of channel-count leads 306 from clock counter 301, provides three functions; namely:

1. scans and distributes to individual channels therein the successive numbers developed by FSK modulator 103;
2. converts each digital number to a corresponding analog signal; and
3. filters the analog signals to eliminate undesired frequency components and applies the filtered signals to a corresponding one of telephone lines 105.

The clock counter, as previously described, produces a channel-count for the sequential sampling of the channels and distribution of the signals. In addition, the clock counter provides the bit-count for the multibit number (which is, in this case, a 10-bit number). Clock counter 301 generally includes a clock source such as an oscillator, identified by block 302 in FIG. 3, bit ring 303 and channel ring 304. The output of oscillator 302 is applied to and drives bit ring 303. Bit ring 303 advantageously comprises a 10-ring counter, each stage providing an output to one of the 10 leads shown as bit-count leads 305, and individually identified as leads B0 through B9. Accordingly, starting with lead B0 of bit-count leads 305, the leads are sequentially pulsed or enabled to define the time slots dedicated to the serial bits in each multibit number.

The output of bit ring 303 (i.e., the output derived when final lead B9 of bit-count leads 305 is pulsed), is passed to channel ring 304. Channel ring 304 advantageously also comprises a multistage bit counter, the number of stages corresponding to the number of data sources and the corresponding number of telephone lines or channels. Each stage of channel ring 304 provides an output to one of $n$ leads shown as channel-count leads 306. Accordingly, the $n$ leads of channel-count leads 306 are sequentially pulsed or enabled, each sequential pulse occurring after the complete cycling of bit ring 303, i.e., after all of the leads of bit-count leads 305 are sequentially pulsed.

As previously described, the sequential pulses on channel-count leads 306 are utilized for scanning the DC baseband binary signals derived from data sources 101. The sequential pulses, and therefore the rate at which channel ring 304 is driven, define the scanning or sampling frequency. As described in detail hereinafter, the sampling frequency is related to the frequency of FSK signals which will be passed to the telephone lines. In the specific embodiment shown, the specific mark frequency is 2225 Hz. and the spacing frequency is 2025 Hz. As a good practical choice a sampling frequency of approximately four times that of the higher transmitted frequency has been selected. In any event, the frequency of oscillator 302 is arranged to drive bit ring 303 at a rate which drives, in turn, channel ring 304 at a rate which defines the predetermined sampling frequency.

Turning now to scanner 102, it is recalled that the scanner functions to sequentially sample the DC baseband signals from data sources 101. As seen in FIG. 1, each data source is connected to an individual gate in scanner 102. Specifically, data source 1 is connected to one input of gate 106(1) and each of the other data sources extends to a corresponding one of gates 106(2) to 106($n$).

The other inputs to gates 106(1) through 106($n$) are connected to individual ones of channel-count leads 306, which leads, as previously described, are sequentially pulsed or enabled. Thus, the DC baseband signals from data sources 1 through $n$ are sequentially sampled and passed through gates 106(1) to 106($n$) to OR gate 107. The output of OR gate 107 therefore comprises sequential bit trains, each bit train comprising a sequence of bits, each bit in the train aligned in a time slot dedicated to a data source and defining the DC baseband signal of that particular source. These signal bit trains are then passed to FSK modulator 103.

FSK modulator 103 may generally be designated as a second-order digital filter which serves as a switchable oscillator, the switching being provided by the bit train output of scanner 102. The signal within the filter is a $k$-bit binary serial bit number which reoccurs every T seconds (in the present embodiment a 10-bit number in the two's-complement form is utilized). In general, this filter includes adder circuit 117, serial subtractor 118, unit delay circuits 119 and 120 and feedback multiplier circuits 115 and 116. It is to be noted that feedback multiplier circuits 115 and 116 are arranged in alternative feedback paths by way of gates 110 and 111, respectively. As described in detail hereinafter, gates 110 and 111 operate under the control of the signal bit train output of scanner 102 to alternatively insert one or the other of multiplier circuits 115 and 116 into the filter feedback path. It is to be further understood that, unless indicated otherwise, the various circuits in the filter constitute digital circuits and the inputs thereof are clocked in by a clock source, not shown, but derived from bit-count leads 305. Specifically, the bit-count leads are advantageously ORed together to provide a clock pulse source having a rate determined by the pulses on all of the bit-count leads. The bit count clock rate "R" is therefore determined by the equality:

$$R=kn/T \qquad (1)$$

where $l/t$ is the sampling frequency, $n$ is the number of channels and $k$ is the number of bits per serial number.

The switchable filter oscillator also includes correction generator 121. As described in detail hereinafter, correction generator 121 provides the function of stabilizing the amplitude of the output signal of the modulator. In addition, correction generator 121 serves to insert an initial number into the filter for the process of startup.

Each of delay circuits 119 and 120 is advantageously a multistage shift register shifted at the above-described clock rate and having a sufficient number of stages to store the 10-bit words of all of the channels (i.e., $10n$ stages). Each of the multiplier circuits 115 and 116 is advantageously of the type described in IEEE Transactions on Audio and Electroacoustics, Vol. AU—16, No. 3, "An Approach to the Implementation of Digital Filters" by L. B. Jackson J. F. Kaiser and H. S. McDonald, page 413. It is noted that the multiplier circuits provide the two's-complement conversion.

The transfer function, H($z$), of the filter is determined by the equation $$H(z)=\frac{1}{1-2z\cos\omega_i T+z^2} \qquad (2)$$

where $\omega_i$ is the desired mark or space frequency of the outgoing frequency shift signal and $z$ is the delay operator and may be related to the Laplace and Fourier transforms by the equality $$z=e^{sT}=e^{j\omega T} \qquad (3)$$

where $j\omega$ is the imaginary part of the complex frequency $s$ and $\omega$ is the radian frequency $2\pi$.

The transfer function, $H(z)$, has poles on the unit circle at $$z=e^{-j\omega_i T}. \qquad (4)$$

In the $s$-plane, the poles are on the imaginary axis at $$s=j(\pm\omega_i+k/T) \qquad (5)$$

where $k$=0, ±1, ±2, . . . This is the borderline of stability, so that once started, the filter will continue to oscillate at a frequency of $\omega_i$ without growth or damping. This is implemented by feeding back the output of delay circuit 120 to an input of subtractor 118 by way of a direct path, as shown, which therefore has unity gain.

The frequency of oscillation is determined by the central coefficient (or multiplier factor) which is expressed as $$2\cos\omega_i T \qquad (6)$$

Each multiplier circuit 115 and 116 is assigned a multiplier factor or constant which is consistent with the desired mark and space frequency. Frequency shift keying is accomplished by changing the central coefficient under control of the incoming pulse train. Specifically, an incoming "1" bit enables gate 110 and thereby inserts multiplier 115 in the filter feedback path. Conversely, an incoming "0" bit in the pulse train enables gate 111 because of the inversion of the bit provided by inverter 112. This, therefore, inserts multiplier 116 in the filter feedback path. Accordingly, the switchable filter oscillator will provide at its output, i.e., at the output of serial subtractor 118, samples of a frequency shift signal (in a numerical sense) whose frequency is determined upon which multiplier 115 or 116 is inserted in the feedback path of the filter.

The output of FSK modulator 103 is passed to distributor 104. More specifically, the time multiplexed multibit numbers are applied to gates 124(1) through 124($n$). The other inputs to these gates are connected to channel-count leads 306. Gates 124(1) through 124($n$) are therefore sequentially enabled, each gate being enabled for the scanning interval allocated to its associated channel to thereby pass therethrough the multibit number dedicated to the channel associated with the particular gate. These numbers are then passed to digital-to-analog converters 125(1) through 125($n$).

Each of digital-to-analog converters 125(1) through 125($n$) comprises conventional digital circuits operating under control of the bit clock to convert the incoming digital number to a corresponding analog signal, i.e., the analog signal developed by the digital-to-analog converter has an amplitude corresponding to the incoming digital number. This analog signal is then passed through a low-pass filter, such as low-pass filter 126(1). This removes all of the aliases normally generated by a digital filter. The output FSK signals of each low-pass filter are then applied to a correspondingly numbered telephone line.

As previously indicated, correction generator 121 provides amplitude stabilization and also provides for initial startup. Amplitude stabilization, in accordance with the disclosed embodiment, is accomplished by measuring the amplitude of the output number and adding corrections to the input number. Specifically, the output number is derived from the output of shift register 119. Since shift register 119 provides a unit delay, this output number defines the sampling immediately prior to the present sample.

The input correction, as described in detail hereinafter, constitutes an addition applied by way of lead 123 to adder 117 to the least significant bit in the multibit number. In general, correction generator 121 tries to maintain the maximum excursion of the positive and negative numbers of the FSK signal at half of the maximum amplitude obtainable in a 10-bit number. Accordingly, the amplitude of the input number is decreased if the number exceeds the half amplitude and increased if several consecutive numbers do not exceed the half amplitude. The amplitude is increased by adding a correction pulse to the least significant bit when the multibit number is positive and is decreased by adding when the multibit number is negative. It is noted that these correction pulses are similarly utilized to initiate startup.

It is recalled that the digital filter utilizes serial arithmetic wherein the negative number is a two's-complement of the positive number. Accordingly, at the zero crossing the two most significant bits of the positive number are "00" and change to "01" when exceeding the half amplitude. With respect to the negative number, at the zero crossing the two most significant bits are "11" and change to "10" when exceeding the half amplitude in magnitude. Recalling that approximately four samples are obtained per cycle for each output signal cycle, the circuitry of correction generator 121 is arranged to:

1. detect when the most significant bits are "01" (the positive number exceeding the half amplitude) and correct the input number by adding a correction pulse two sample intervals subsequent to the detected number (the present number thus now being negative); and 2. detect when the most significant bits are not "01" for four consecutive samples (the positive number does not exceed the half amplitude) and correct by adding a correction pulse two sample intervals after the interval when the most significant bit is "1," (i.e., two sample intervals after the number is negative and is, therefore, now positive).

Figure 2:
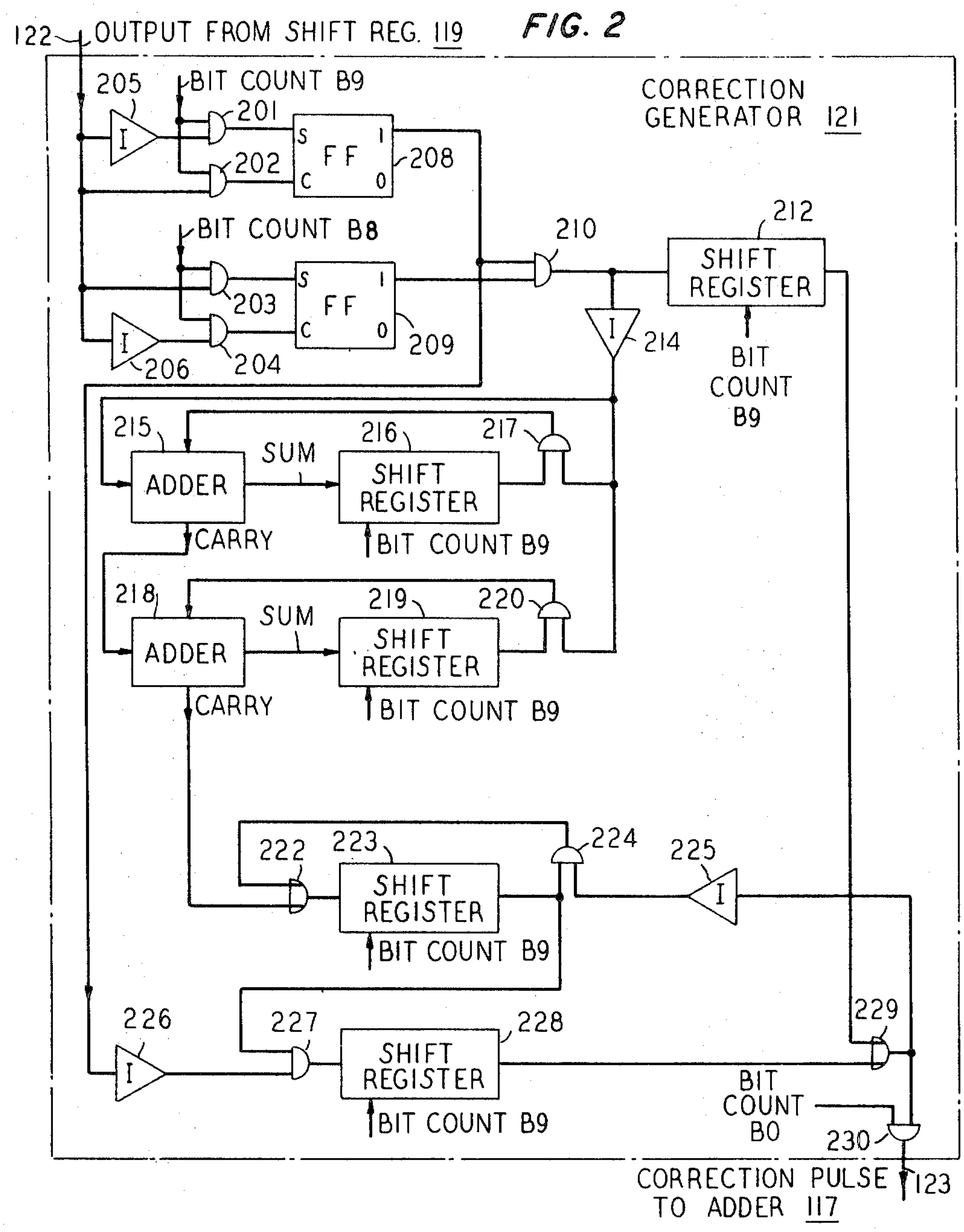
FIG. 2 shows, in schematic form, the details of the feedback number correction circuit.

Detection of the most significant bits is provided, as seen in FIG. 2, by gates 201 through 204, inverters 205 and 206, flip-flops 208 and 209 and AND gate 210. The output of shift register 119 is passed by way of lead 122 to gates 202 and 203 and, via inverters 205 and 206, to gates 201 and 204, respectively. The other inputs to gates 203 and 204 are connected in common to lead B8 of bit-count leads 305, while the other inputs to gates 201 and 202 are connected in common to lead B9 of bit-count leads 305. It is therefore seen that the inputs to gates 203 and 204 are gated through when lead B8 is enabled (i.e., during the interval allocated to the next-to-most significant bit). It is also seen that the inputs to gates 201 and 202 are gated through during the time slot allocated to the most significant bit.

In the event that the next-to-most significant bit obtained from the output of shift register 119 is a "1," this bit will be applied to the input of gate 203 concurrently with the enabling of lead B8. Accordingly, the bit will be passed through gate 203 to set flip-flop 209. Conversely, if the next-to-most significant digit is a "0" bit, the bit will be inverted by inverter 206 and passed through gate 204 to clear flip-flop 209. Accordingly, flip-flop 209 is set when the next-to-most significant digit is a "1" bit and is clear when it is a "0" bit.

Similarly, when the most significant bit is a "1," gate 202 will gate the bit therethrough to clear flip-flop 208. Conversely, when the most significant bit is a "0," inverter 205 inverts the bit and gate 201 gates it through to set the flip-flop. Thus, flip-flop 208 is set when the most significant bit is "0" and is clear when the most significant bit is "1."

Output terminal "1" of each of flip-flops 208 and 209 is connected to AND gate 210. The output of AND gate 210 is therefore "1" when both flip-flops 208 and 209 are set. Thus, during the time slot allocated to the most significant bit of the multibit word, the output bit of AND gate 210 is "1" when the two most significant bits are "01." It is noted that flip-flop 208 is set when the most significant bit is "0." Since this bit is the sign bit (and therefore indicates the polarity of the multibit number), flip-flop 208 is therefore set only when the multibit number is positive. This output of flip-flop 208 also extends to AND gate 227 by way of inverter 226. The function of these latter circuits will be described hereinafter.

The output of AND gate 210 extends to shift register 212 and inverter 214. Shift register 212 advantageously comprises $n$ stages, one for each channel, with incoming gating pulses and shift pulses provided by lead B9 of bit-count leads 305. Accordingly, during the bit count interval allocated to the most significant bit, the output of AND gate 210 is inserted in shift register 212 and the contents of shift register 212 are concurrently shifted. After a delay of a sampling period and during the interval allocated to the channel associated with the above-described AND gate 210 output, the bit inserted in shift register 212 appears at the output of the register. This output is passed by way of OR gate 229 to AND gate 230.

Since, as it will be recalled, a delay of one sampling period is provided by shift register 119, in FIG. 1, and a corresponding delay is provided by shift register 212, the output of shift register 212 is derived from the multibit number developed two sampling periods prior. If the two most significant bits were "01,"a "1" bit is now applied to gate 230. The other input to gate 230 extends to lead B0 of bit-count leads 305. Accordingly, the "1" bit is passed through gate 230 and to output lead 123 during the interval dedicated to the least significant bit. As previously described, this bit functions as the correction pulse that is applied to adder 117. Thus, in accordance with a first previously described function of correction generator 121, when the two most significant bits are "01," a correction pulse is developed two sample intervals later.

The output of AND gate 210 is also applied through inverter 214 to adder 215 and AND gates 217 and 220. Recalling that the output of AND gate 210 is a "1" bit if the two most significant digits are "01" during the previous sampling period, it is seen that the output of inverter 214 is a "1" bit if the two most significant bits are not "01." In this event, a "1" bit is applied to one input of adder 215, thereby producing a "1" bit at the output SUM lead if the other input to adder 215 is assumed to be zero. This "1" bit is applied to shift register 216.

Shift register 216 is arranged in substantially the same manner as shift register 212, with input gating and shifting provided by lead B9 of bit-count leads 305. Therefore, a "1" bit output is provided by shift register 216 during the sample interval following the interval wherein a "1" bit was inserted at the input thereof. If the two most significant bits of the multibit word in this following sampling interval are also not "01," then "1" bits are applied to AND gate 217 by both shift register 216 and inverter 214. Accordingly, "1" bits are applied to both inputs of adder 215, whereby a "1" bit carry is passed to adder 218 and a "0" bit sum is passed to shift register 216. Adder 218 thereupon passes a "1" bit sum to shift register 219.

Shift register 219 is arranged in substantially the same manner as shift register 216 and provides input gating and shifting under control of lead B9 of bit-count leads 305. Therefore, with a "1" bit applied to the input of shift register 216, a "1" bit is shifted to the output during the next sampling interval of the channel of interest. Shift register 219 applies the "1" bit to AND gate 220. Since a "0" bit was applied to the input of shift register 216, shift register 216 applies a "0" bit to AND gate 217 at this time. If the two most significant bits of the next subsequent word are again not "01, " inverter 214 is now applying a "1" bit to AND gate 220 and AND gate 220 therefore applies a "1" bit to an input of adder 218. At this time AND gate 217 is, of course, applying a "0" bit to adder 215 concurrently with inverter 214 applying a "1" bit thereto. Accordingly, during the most significant bit interval of the third word (all having the two most significant bits of not "01"), the outputs of adder 215 provide a "1" bit sum and a "0" bit carry and the outputs of adder 218 also provide a "1" bit sum and a "0" bit carry.

Assume now that, for the fourth scanning interval, the two most significant bits of the multibit word are again "01." Inverter 214 therefore applies "1" bits to gates 217 and 220 and, in addition, to adder 215. At this time the output bits of shift registers 216 and 219 are both "1" and gates 217 and 220 therefore both apply "1" bits to adders 215 and 218. Adder 215 therefore applies a "1" bit carry to adder 218. Accordingly, adder 218 passes a "1" bit carry through OR gate 222 to shift register 223.

In summary, it is seen that a "1" bit carry is generated by adder 218 when the two most significant bits of the numbers of four consecutive scans of any channel are a "01." It is noted that in the event that any one of the successive numbers provides two most significant bits which are "01," then the output of inverter 214 develops a "0" bit. This "0" bit disables AND gates 217 and 220 and passes a "0" bit to adder 215. The sum and carry outputs of adder 215 in this event become "0" as does the sum and carry output of adder 218. This then clears out the circuit with respect to the time slot allocated to the channel, whereby the next "1" bit from inverter 214 restarts the cycle from the initial condition.

Returning now to shift register 223, this register is a multistage shift register, arranged in substantially the same manner as shift registers 216 and 219 and providing gating and shifting under control of lead B9 of bit-count leads 305. Accordingly, the "1" bit applied to the register is stored therein and shifted to appear at the output thereof during the time slot allocated to the channel for the next successive sampling interval. If a correction pulse is not being provided during this sample interval for the channel, OR gate 229 is providing a "0" bit at the output thereof (it being recalled that shift register 212 provides a "1" bit for a correction pulse and that, as will be described hereinafter, shift register 228 provides a "1" bit at the output thereof for a correction pulse). Thus, assuming no correction pulse is being applied, OR gate 229 passes a "0" bit to inverter 225 which, in turn, applies a "1" bit to AND gate 224. Thus, the output bit in shift register 223 is recycled by way of AND gate 224 and OR gate 222 so long as a correction pulse is not being provided by correction generator 121.

The "1" bit output of shift register 223 is also passed to AND gate 227. The other input to AND gate 227 is provided by inverter 226 and, as previously described, the output of inverter 226 is down when flip-flop 208 is set and up when flip-flop 208 is clear.

Since flip-flop 208 is clear when the number for the previous sample is negative, AND gate 227 is therefore enabled when the word for the previous sampling period is negative and under this situation passes the "1" bit output of shift register 223 to the input of shift register 228.

Shift register 228 is arranged in substantially the same manner as the other shift registers, gating and shifting being provided by lead B9 of bit-count leads 305. Therefore, during the next successive sampling interval allocated to the channel (after the "1" bit is applied to the input of shift register 228), the register passes a "1" bit through OR gate 229 to AND gate 230. When the gating pulse is applied to AND gate 230 from lead B0 of bit-count leads 305 a correction pulse is thereby generated and passed to adder 117 by way of lead 123. The "1" bit output of shift register 228 is also passed through OR gate 229 to inverter 225, which blocks AND gate 224 to clear the cycling of the "1" bit in shift register 223. Accordingly, the above-described circuits determine if during four consecutive samples the two most significant bits of the word are not "01" and in this event provide a correction pulse two sampling intervals after a negative word is detected.

Although a specific embodiment of this invention has been shown and described, it will be understood that various modifications may be made without departing from the spirit of this invention.

I claim:

1. A frequency-shift signal modulator including a digital filter for processing multibit numbers to simulate continuous analog filter functions, means for placing the filter on the borderline of stability whereby the filter oscillates in a numerical sense a feedback path, a first and a second feedback means for determining the central coefficient of the filter, and switch means responsive to the application of data signals for alternatively inserting the first and second feedback means in the feedback path.

2. A frequency-shift modulator in accordance with claim 1 wherein the arranged means comprises a further feedback path having unity gain.

3. A frequency-shift signal modulator in accordance with claim 1 wherein each feedback means comprises means for multiplying the filter output number with a constant.

4. A frequency-shift signal modulator in accordance with claim 3 wherein there is further included means responsive to the amplitude of the filter output numbers for modifying the multiplied feedback number whereby the filter output amplitude is stabilized.

5. An oscillator including a digital filter for processing multibit numbers to simulate continuous analog filter functions, the filter including first feedback means for multiplying the filter output number with a constant and further feedback means for placing the filter on the borderline of stability whereby the filter oscillates in a numerical sense, CHARACTERIZED IN THAT modifying means responsive to the amplitude of the filter output numbers feeds back modified output numbers.

6. An oscillator in accordance with claim 5 wherein the modifying means modifies the multiplied feedback number.

7. An oscillator in accordance with claim 5 wherein the modifying means decreases the value of a feedback number if the amplitude of an output number exceeds a predetermined limit.

8. An oscillator in accordance with claim 7 wherein the modifying means decreases the value of the feedback number by adding a correction number to the feedback number which is one-half a signal cycle after the output number that exceeds the predetermined limit.

9. An oscillator in accordance with claim 5 wherein the modifying means increases the value of the feedback number if the amplitudes of the filter output numbers do not exceed a predetermined limit.

10. An oscillator in accordance with claim 9 wherein the modifying means operates to increase the value of the feedback number when the amplitudes of a full signal cycle of output numbers do not exceed the predetermined limit.

11. A signal modulator including a digital filter for processing multibit numbers to simulate continuous analog filter functions, means for placing the filter on the borderline of stability whereby the filter oscillates in a numerical sense and means responsive to incoming baseband signals for determining the central coefficient of the filter.